May 7, 1957 W. L. BROWN 2,791,759
SEMICONDUCTIVE DEVICE
Filed Feb. 18, 1955
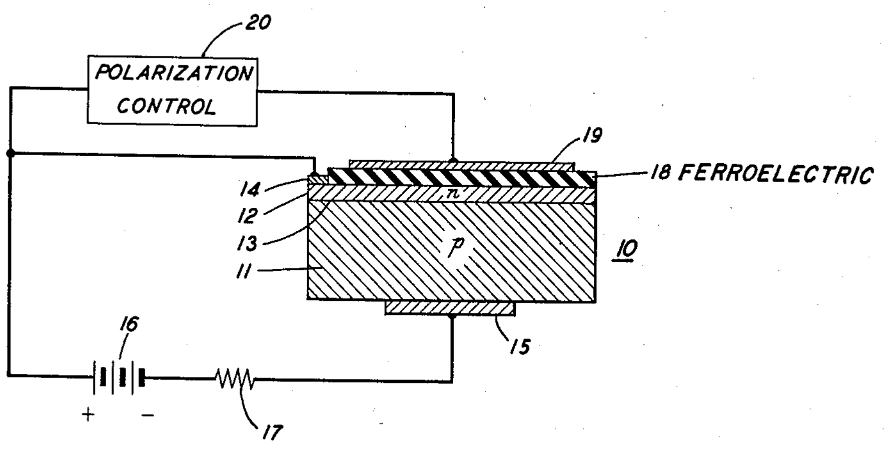
INVENTOR
W. L. BROWN
BY Arthur J. Torsiglieri
ATTORNEY United States Patent Office 2,791,759

Patented May 7, 1957

2,791,759

SEMICONDUCTIVE DEVICE

Walter L. Brown, Plainfield, N. J., assignor to Bell Telephone Laboratories, Incorporated, New York, N. Y., a corporation of New York Application February 18, 1955, Serial No. 489,149

6 Claims. (Cl. 340—173)

This invention relates to bistable semiconductive devices and more particularly to such bistable devices which exhibit a memory.

In the electron and switching and computing fields there are various applications for a device which can be switched readily between a state in which the device presents a high impedance across a pair of electrodes associated therewith and a state in which the device presents a low impedance across the same pair of electrodes. In particular, in such fields there is a special need for control purposes for a device which can be switched to one of the two states by temporarily energizing in a first sense an auxiliary circuit and which will then hold that state, even after the auxiliary circuit is deenergized, until such time as the auxiliary circuit is energized again in a second different sense. This property of remaining in one of two stable states even after the auxiliary circuit which fixes the state is deenergized is termed a memory. Although various forms of semiconductive devices have been known hitherto which exhibit bistable properties of the kind described, such devices generally have not been characterized by a memory and so have not proved satisfactory for the various applications intended for a device in accordance with the invention. Moreover, although there have been known hitherto various forms of bistable devices which exhibit a memory, generally involving the use of an element which is characterized by ferroelectric properties, such devices generally have not been completely satisfactory for various other reasons.

Accordingly, it is the primary object of the present invention to satisfy the need for an improved bistable element exhibiting a memory.

To this end, the present invention is directed towards an element which employs the memory exhibited by a ferroelectric element in conjunction with the bistable impedance characteristics of a semiconductive body which, in turn, either includes or does not include a rectifying junction interposed between a pair of electrodes electrically connected to the body. In an illustrative embodiment of the invention, a ferroelectric element is positioned closely adjacent a portion of the surface of a semiconductive body and the state of polarization of the ferroelectric element through the agency of the electric field associated with such state of polarization is made to control the conductivity type of the closely adjacent portion of the semiconductive body. For one state of polarization the conductivity type of the adjacent portion of the semiconductive body is such that a rectifying junction extends in the semiconductive body intermediate between a pair of electrodes electrically connected to the body. In this case the device presents a high impedance between the pair of electrodes. In the other state of polarization, the conductivity type of the adjacent portion of the semiconductive body is such that there is no appreciable rectifying junction extending between the pair of electrodes. In this case the device presents a low impedance across the pair of electrodes. Advantageously, for reasons to be discussed in more detail hereinafter, in a preferred embodiment of the invention the ferroelectric element is of guanidinium aluminum sulfate hexahydrate.

The invention will be described more fully in connection with the drawing which represents a circuit arrangement which includes a bistable memory device in accordance with the invention.

With reference particularly to the drawing, a single crystal germanium body 10 whose gross portion 11 is p-type includes in the absence of induced fields a thin surface layer 12 which is n-type. Typically, such an n-type surface layer can be formed by the controlled diffusion of arsenic from a vapor state into such a surface. The germanium body accordingly includes a planar rectifying junction 13 which extends completely across the semiconductive body parallel to the arsenic-diffused surface. Electrodes 14 and 15 are connected on opposite sides of the rectifying junction 13 and a voltage source 16 is connected therebetween for biasing the rectifying junction 13 in the reverse direction. As a consequence, a high impedance is presented by the semiconductive element across the electrodes 14 and 15 and only a small reverse current flows in the series circuit including the voltage source 16, the germanium body 10, and a load, shown schematically as the resistance 17. Electrode 14, which makes ohmic connection to the n-type surface layer 12, advantageously is positioned either to extend along a top edge of the body as shown or along a side edge of the body. Positioned closely adjacent the thin n-type surface layer 12 and extending parallel to the planar junction 13 is a thin ferroelectric wafer 18. The ferroelectric element 18 is positioned as close to the n-type surface layer of the semiconductive body as possible. In some instances, it may be desirable to insert a dielectric filler intermediate the ferroelectric element and a semiconductive body to minimize any air gaps therebetween. Such a dielectric filler advantageously should have high dielectric constant and breakdown strength and low leakage. An electrode 19 is provided on the surface of the ferroelectric wafer 18 opposed to the surface contiguous with the semiconductive body. A polarization control source 20 is connected across electrodes 14 and 19 to supply control pulses whose sense or polarity sets the polarization state of the ferroelectric element.

A ferroelectric crystal is defined as a crystal which even in the absence of an applied electric field has an effective center of positive charge which does not coincide with the effective center of negative charge so that the crystal exhibits a spontaneous electric dipole moment and is characterized by a spontaneous or remanent polarization. The sense of the spontaneous polarization can ordinarily be reversed by an applied electric field. The minimum intensity of electric field which it is necessary to apply to reverse the direction of spontaneous polarization is related to the coercive force of the ferroelectric material. The characteristics of ferroelectric materials are described more fully in a book entitled "Introduction to Solid State Physics," by C. Kittel, chapter 7, pages 113 through 132, published by John Wiley & Sons, Incorporated (1953).

If the state of spontaneous polarization of the ferroelectric element is such that the effective center of positive charge in the element is more proximate to the n-type semiconductive surface zone 12 than the effective center of negative charge the surface of the ferroelectric element contiguous to the semiconductive body may be viewed as positively charge, giving rise to an electric field which will penetrate the adjacent semiconductive surface.

The electric field associated with this state of polarization of the ferroelectric element will not materially affect the distribution of excess conduction electrons within the n-type surface layer 12 so that it remains of n-type conductivity. Such a polarization state can be insured by applying between the electrodes 14 and 19 a pulse which is of the sign which makes the electrode 19 more positive and is of sufficient amplitude that there is applied across the ferroelectric element an electric field which overcomes the coercive forces in the ferroelectric wafer. Once this polarization state is established in the ferroelectric wafer, it tends to remain in that state charged to the value of the remanent polarization. So long as this polarization state continues, the existence of the reverse biased rectifying junction extending between electrodes 14 and 15 insures that only the small reverse current will flow through load 18.

The state of polarization of the ferroelectric element can be reversed simply by applying a pulse which makes electrode 19 more positive than electrode 14 by a voltage sufficient to overcome the coercive forces in the ferroelectric wafer. In the new state of polarization the center of negative charge is proximate the surface contiguous with the semiconductive element. This effectively may be reviewed as a negative charge distribution along the ferroelectric surface contiguous to the semiconductive element. The electric field penetrating into the semiconductive element associated with this state of polarization of the ferroelectric element acts to drive conduction electrons from the n-type surface layer of the semiconductor. When this effect is sufficiently strong, enough conduction electrons will be driven from the surface layer that it will be no longer n-type and the rectifying junction 13 will be substantially eliminated. There may remain a small rectifying junction localized where the electrode 14 makes contact to the diffused layer but such a junction ordinarily will not exhibit a high impedance. Accordingly, in this state of polarization of the ferroelectric element, the semiconductive element presents a relatively low impedance between the electrodes 14 and 15 and a high current flows in the load. Advantageously, for most applications the impedance of the semiconductive element should vary by a ratio of at least ten to one between its high and low values.

The change from n-type conductivity of the surface layer under the influence of the electric field induced by the remanent polarization of the ferroelectric element may be explained briefly as follows: The electric field induced in the semiconductive element in the region of penetration is of a direction to raise there the energy for conduction electrons. As a consequence, there is a tendency for conduction electrons to flow from this region of relatively high energy to regions of relatively lower energy deeper into the semiconductive element. In the region which is appreciably depleted of electrons, either holes become the majority carriers or the region may become substantially intrinsic. If the induced field is made to penetrate completely the surface diffusion layer 12 so that the conductivity type of this layer is altered, the rectifying junction will be substantially eliminated.

In order to insure maximum penetration into the semiconductor of the electric field induced by the ferroelectric element, it is desirable that the concentration of donor significant impurity atoms increases with increasing distance into the semiconductive body while approaching nearer to the rectfying junction. Although such a distribution is not that of the kind ordinarily resulting from the more normal techniques for diffusing significant impurity atoms in from the surface of a semiconductive body, such a distribution can be approximated by first diffusing in a concentration of significant impurity atoms and subsequently diffusing out from the surface region a portion of the impurity atoms previously introduced. Various other techniques will appear to one skilled in the art for approximating the advantageous distribution described.

Upon reversal of the polarization state of the ferroelectric to that associated with the quiescent state of operation, the electric field induced by the ferroelectric element in the semiconductive body is of a direction to lower the energy level there for free conduction electrons, and so the free conduction electrons which had migrated return under the influence of electrostatic forces and the surface layer 12 returns to n-type conductivity.

There are various considerations of importance. The concentration of donor atoms per unit area of surface of the n-type surface layer puts a lower limit on the intensity of the induced electric field needed to penetrate completely the layer. This concentration is the number of donor atoms in a rectangular parallelepiped which has the thickness of the diffusion layer as its height and a unit area as its base. Accordingly, for a given intensity of induced electric field, it is desirable that the diffusion layer be thin so that the volume concentration in the diffusion layer need not be prohibitively low. For each semiconductive material, there is also a characteristic limiting depth to which an electric field can be made to penetrate with an appreciable intensity. For germanium, this is of the order of 1000 Angstroms.

It is to be noted that not all of the charge associated with the remanent polarization is effective for inducing an electric field in the semiconductive body. Surface states on the semiconductive body will tend to neutralize some of this field. Any gaps between the ferroelectric element and the semiconductive body will result in a larger share of the remanent polarization being used to set up an internal electric field in the ferroelectric element in preference to inducing an electric field in the semiconductive body.

In a preferred embodiment of the invention, the ferroelectric element is advantageously monocrystalline guanidinum aluminum sulphate hexahydrate. The properties of such a ferroelectric are set forth in detail in a copending application Serial No. 489,193, filed February 18, 1955, by B. T. Matthias. In particular, the use of such a ferroelectric element provides certain advantages over other possible ferroelectric materials such as barium titanate. Probably the most important is the increased convenience in the preparation and use of guanidinium aluminum sulphate hexahydrate. Additionally, the remanent polarization of this material is sufficiently low that in any gap that unavoidably exists between the ferroelectric element and the semiconductive body the electric field should be insufficient to result in an electrical breakdown across the gap. Such breakdown might affect deleteriously the memory of the ferroelectric element. Moreover, the remanent polarization of such a ferroelectric element is of a convenient value from several other respects. It is sufficiently low that applied voltages of moderate value may be used to control the polarization state of the element, yet sufficiently high that the field induced into a semiconductive body positioned close by is adequate to punch through a diffusion layer of thicknesses readily achieved by known techniques for forming surface diffusion layers on a semiconductive body. Additionally, it has a relatively low dielectric constant which maximizes the electric field which will be induced in the semiconductive body.

In particular, by the use of guanidinium aluminum sulphate hexahydrate there can be induced with ferroelectric elements a few mils thick an electric field in a germanium body which can displace a surface concentration of $10^{12}$/cm.$^2$ impurity atoms. For a typical diffusion layer of approximately 1000 Angstroms thickness, this corresponds to an average volume concentration of $10^{17}$ atoms/cm.$^3$ in the diffusion layer. Additionally, the coercive force of guanidinium aluminum sulphate hexahydrate is approximately 1500 volts/centimeters so that the state of polarization of the ferroelectric element can readily be changed in bistable devices of the kind described with applied voltages of the order of tens of volts even after making allowance for the losses across any gap between the ferroelectric wafer and the semiconductive body.

It is characteristic of a bistable device of the kind described that the measurement of the conductance of the semiconductive body does not affect the state of polarization of the ferroelectric element. In the terminology familiar to workers in the computer art, such a device has the property of nondestructive read-out. This property makes such a device useful as a storage element in the control circuit of an electronic switching system or of a digital computer. It also adapts the device for various applications as a logic element in various control systems.

While the embodiment described has been one in which there is used a semiconductive body which in the absence of induced fields includes a rectifying junction intermediate between a pair of spaced electrode connections thereto, an alternative embodiment is feasible in which there is incorporated a semiconductive body which in the absence of induced fields does not include a rectifying junction intermediate between a pair of spaced electrode connections to the body. In such an embodiment, the ferroelectric element, in its active state of polarization, is made to induce in the semiconductive body an electric field which acts to change the conductivity type of a surface region of the body and accordingly there is then introduced a planar rectifying junction in the body in a way to increase its impedance viewed across the pair of electrodes.

It is further to be understood that the embodiment which has been described in detail is merely illustrative of the general principles of the invention. Various modifications are feasible without departing from the spirit and scope of the invention. For example, semiconductive materials such as silicon, silicon-germanium alloys, and semiconductive compounds may be used in place of germanium for the semiconductive body. Various impurities may be used for forming the surface diffusion layer which can be p-type in an n-type body as well as n-type in a p-type body. Moreover, although guanidinium aluminum sulphate hexahydrate provides the advantages set forth, any of the other ferroelectric materials described in the afore-identified Matthais application and known other ferroelectrics like barium titanate may be substituted without departing from the scope of the invention.

Reference is made to copending applications Serial No. 489,241, filed February 18, 1955, by J. A. Morton; Serial No. 489,223, filed February 18, 1955, by I. M. Ross; and Serial No. 489,141, filed February 18, 1955, by D. H. Looney, each of which relates to a device which employs the combination of a ferroelectric element and a semiconductive body.

What is claimed is:

1. In combination, a semiconductive body having a gross portion of one conductivity type and a surface portion of opposite conductivity type forming a rectifying junction in the body, a ferroelectric element positioned adjacent said surface portion of the body and extending substantially parallel to said rectifying junction, a pair of electrodes, separate electrodes of said pair being connected to the semiconductive body on opposite sides of the rectifying junction, and an electrode spaced from the semiconductive body and connected to the ferroelectric element.

2. A bistable device comprising a semiconductive body having in one stable state a gross portion of one conductivity type and an extended surface portion of opposite conductivity for forming an extended rectifying junction in the body and being in the other stable state substantially entirely of the one conductivity type, a pair of electrodes connected to said body at spaced regions which in the one stable state of the semiconductive body are on opposite sides of the extended rectifying junction, and means comprising a ferroelectric element positioned closely adjacent the surface portion of the semiconductive body for controlling the state of the semiconductive body.

3. A bistable device according to claim 2 in which the semiconductive body is of germanium and the ferroelectric element is of guanidinium aluminum sulphate hexahydrate.

4. A circuit arrangement comprising a bistable device comprising a semiconductive body having a gross portion of one conductivity type and a surface portion of opposite conductivity type for forming an extended rectifying junction in the body, a pair of electrodes connected to said body on opposite sides of the extended rectifying junction, an elongated ferroelectric element positioned adjacent said surface portion of the semiconductive body and extending substantially parallel to said rectifying junction, an electrode connected to said ferroelectric element on a surface opposite the surface adjacent the semiconductive body, means connected to said pair of electrodes including utilization means and a source of voltage for biasing the rectifying junction in the semiconductive body in the reverse direction, and means including a source of voltage for controlling the polarization state of the ferroelectric element connected between the electrode to said ferroelectric element and one of the pair of electrodes to said semiconductive body.

5. In combination, a semiconductive body having a gross portion of one conductivity type and a surface portion of opposite type forming a planar rectifying junction in the body, the surface portion being characterized in that the concentration of the predominant significant impurities therein reaches a maximum in from the surface, a ferroelectric element positioned closely adjacent said surface portion of the body and extending parallel to the planar rectifying junction in the body, a pair of electrodes making separate electrical connection to the semiconductive body on opposite sides of the rectifying junction, and a third electrode making electrical connection to the ferroelectric element.

6. A circuit arrangement including the combination of claim 5 in further combination with a voltage source and a load connected serially between the pair of electrodes and with a voltage source connected between the third electrode and the electrode of said pair making electrical connection to the surface portion of the semiconductive body.

References Cited in the file of this patent

A textbook, "Electrons and Holes in Semi-Conductors," by Schockley, published November 1950, Van Nostrand Co.; pages 29 and 30 are relied upon.

Proceedings of Western Computer Conference, June 1953, "The Snapping Dipole of Ferroelectrics as Memory Element for Digital Computers," by Pulvari, page 158 relied upon.